US012705114B2

(12) United States Patent
Sun et al.

(10) Patent No.: US 12,705,114 B2
(45) Date of Patent: Aug. 11, 2026

(54) PARAMETER CONFIGURATION METHOD AND RELATED SYSTEM

(71) Applicant: Huawei Cloud Computing Technologies Co., Ltd., Guizhou (CN)

(72) Inventors: Tao Sun, Xi'an (CN); Pengcheng Xie, Shenzhen (CN); Tuo Ai, Shenzhen (CN); Xiaosong Lei, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 568 days.

(21) Appl. No.: 18/190,366

(22) Filed: Mar. 27, 2023

(65) Prior Publication Data

US 2023/0229528 A1 Jul. 20, 2023

Related U.S. Application Data

(63) Continuation of application No. PCT/CN2021/119821, filed on Sep. 23, 2021.

(30) Foreign Application Priority Data

Sep. 25, 2020 (CN) ......................... 202011022613.7
Nov. 18, 2020 (CN) ......................... 202011293862.X

(51) Int. Cl.
*G06F 9/54* (2006.01)

(52) U.S. Cl.
CPC .................................... *G06F 9/541* (2013.01)

(58) Field of Classification Search
None
See application file for complete search history.

(56) References Cited

U.S. PATENT DOCUMENTS 7,446,780 B1 * 11/2008 Everitt .................. G06T 15/503 345/611
2010/0091888 A1 * 4/2010 Nemiroff ............. H04N 19/115 375/E7.154

(Continued)

FOREIGN PATENT DOCUMENTS

CN 104813674 A * 7/2015 ............. H04N 5/262
CN 105323604 A 2/2016

(Continued)

OTHER PUBLICATIONS

Herodotou Herodotos, et al., "A Survey on Automatic Parameter Tuning for Big Data Processing Systems," ACM Computing Surveys, New York, NY, US, vol. 53, No. 2, Apr. 26, 2020, 37 pages.

*Primary Examiner* — Charles E Anya
(74) *Attorney, Agent, or Firm* — Conley Rose, P.C.

(57) ABSTRACT

A parameter configuration method includes: receiving a configuration parameter of a service system and a service objective of the service system through a standard interface, performing parameter optimization on the configuration parameter to obtain a recommended parameter value that meets the service objective, and then outputting the recommended parameter value to implement parameter configuration for the service system. The parameter configuration method abstracts parameter configuration problems in different service scenarios into a mathematical problem of inputting and expression through a standard interface. In this way, a universal parameter configuration method is provided without case-by-case parameter configuration. In addition, an expert in the service field can independently complete parameter configuration without artificial intelligence experience.

20 Claims, 6 Drawing Sheets

S302: A parameter configuration system 100 receives a configuration parameter and a service objective

↓

S304: The parameter configuration system 100 performs parameter optimization on the configuration parameter to obtain a recommended parameter value that meets the service objective

↓

S306: The parameter configuration system 100 outputs the recommended parameter value, to configure the configuration parameter

(56) References Cited

U.S. PATENT DOCUMENTS

2015/0213389 A1* 7/2015 Modarresi ........ G06Q 10/06393 705/7.39
2016/0248834 A1* 8/2016 Richards ................ H04N 19/46
2018/0143891 A1* 5/2018 Polisetty ................. G06F 9/542
2023/0185631 A1* 6/2023 Subbarao .............. G06F 9/5016 718/104

FOREIGN PATENT DOCUMENTS

CN 105915904 A 8/2016
CN 106648654 A * 5/2017 ........... G06F 18/214
CN 107770633 A 3/2018
CN 109579556 A * 2/2019 ............... H04N 7/18
CN 111083125 A 4/2020
CN 111625918 A 9/2020
WO 2016061283 A1 4/2016
WO 2019052307 A1 3/2019

* cited by examiner

Processor
702

Communication
interface 703

Bus 701

Program code

Memory 704

Computing device
700

PARAMETER CONFIGURATION METHOD AND RELATED SYSTEM

CROSS-REFERENCE TO RELATED APPLICATIONS

This is a continuation of International Patent Application No. PCT/CN2021/119821 filed on Sep. 23, 2021, which claims priority to Chinese Patent Application No. 202011293862.X filed on Nov. 18, 2020, and Chinese Patent Application No. 202011022613.7 filed on Sep. 25, 2020. All of the aforementioned patent applications are hereby incorporated by reference in their entireties.

TECHNICAL FIELD

This application relates to the field of computer technologies, and in particular, to a parameter configuration method and system, a device, and a computer-readable storage medium.

BACKGROUND

With the wide application of computer technologies in different fields, the types and the quantity of information technology (IT) facilities are increasing. The IT facility, also known as an IT infrastructure, is a facility used to support IT services. The IT facility may specifically include bottom-layer hardware and upper-layer software. The bottom-layer hardware may include a computing platform and a network communication platform, and the upper-layer software may include software running on the foregoing platform, such as an operating system and application software.

These IT facilities have a large quantity of parameters. To improve performance, parameter optimization is often required. Therefore, some parameter configuration methods are provided in the industry to implement parameter optimization. However, in these methods, parameter optimization is usually performed for a specific problem, that is, parameter optimization is performed in a case-by-case manner. During parameter optimization, experts in the service field and experts in the artificial intelligence (AI) field are required for long-term and robust communication. As a result, parameter configuration efficiency is low, and parameter configuration costs are very high.

A low-cost and efficient parameter configuration method is in urgent need in the industry, to implement parameter optimization in different service scenarios.

SUMMARY

This application provides a parameter configuration method. In this method, parameter configuration problems in different service scenarios are abstracted into a mathematical problem of inputting and expression through a standard interface, so as to provide a universal parameter configuration method, without a need of case-by-case parameter configuration. In addition, parameter optimization is automatically performed based on inputting through the standard interface. An expert in the service field can independently complete parameter configuration without AI experience, to reduce a communication time and costs, thereby improving configuration efficiency, and reducing configuration costs. This application further provides a system, a device, a computer-readable storage medium, and a computer program product corresponding to the foregoing method.

According to a first aspect, this application provides a parameter configuration method. The method may be performed by a parameter configuration system. Specifically, the parameter configuration system receives a configuration parameter of a service system and a service objective of the service system through a standard interface, then performs parameter optimization on the configuration parameter to obtain a recommended parameter value that meets the service objective, and then outputs the recommended parameter value to configure the configuration parameter.

The configuration parameter is at least one of configurable parameters of the service system, and the configuration parameter may be specifically determined by a user (for example, an expert in the service field) from the configurable parameters. The configuration parameter may be defined according to a specified format, for example, according to a format specified by a standard interface. For example, the configuration parameter can be defined by using fields such as parameter name, parameter type, and parameter value space. Considering that some configuration parameters further have initial values, in some embodiments, the configuration parameter may be further defined by using the initial value.

The service objective is a requirement of at least one key performance indicator (KPI) specified based on requirements of the service system. Similar to the configuration parameter, the service objective may also be defined according to a specified format, for example, according to a format specified by a standard interface.

In this method, parameter configuration problems in different service scenarios are abstracted into a mathematical problem of inputting and expression through a standard interface, to provide a universal parameter configuration method, without case-by-case parameter configuration. In addition, in the method, parameter optimization may be automatically performed according to inputting through the interface, to obtain the recommended parameter value. In this way, an expert in the service field can independently complete parameter configuration without AI experience, to reduce time costs and labor costs of communication between an expert in the service field and an expert in the AI field, thereby further improving configuration efficiency, and reducing configuration costs.

In some possible implementations, the parameter configuration system may further receive at least one of load and a constraint condition through the standard interface. The load may include environmental load and service load. The environment load is used to describe software and hardware facilities of the service system, for example, describe an operating system type, a computing platform type, a deployment manner, and the like that are used by the service system. The service load is used to describe service data, for example, describe a data amount, data distribution, and the like of the service data. The constraint condition is specifically a condition that needs to be met for parameter optimization of the service system. For example, when the configuration parameter is a hot parameter (a parameter with high update frequency), the constraint condition may be real-time parameter optimization. When the configuration parameter is a cold parameter (a parameter with low update frequency), the constraint condition may be offline parameter optimization. Further, when costs of parameter verification are high, the constraint condition may alternatively be that a quantity of verification times is less than a preset quantity of times.

Correspondingly, the parameter configuration system may perform parameter optimization on the configuration parameter based on at least one of the load and the constraint condition, to obtain the recommended parameter value that meets the service objective. A proper parameter optimization algorithm may be determined according to the foregoing load and constraint condition to perform parameter optimization. In this way, a recommended parameter value can be determined as soon as possible, unnecessary overheads are avoided, configuration efficiency is improved, and configuration costs are reduced.

In some possible implementations, the standard interface is a standardized and normalized interface, and the standard interface may specifically include an application programming interface (API). In this way, the parameter configuration system may provide a parameter configuration service for the user by invoking an API, thereby meeting a personalized requirement.

It should be noted that the API is merely a specific example of the standard interface. In some possible implementations, the standard interface may alternatively be an interface in another format, for example, may be an interface in a customized format.

In some possible implementations, the standard interface includes a configuration parameter API, a service objective API, a load API, and a constraint condition API. The configuration parameter API, the service objective API, the load API, and the constraint condition API may be different APIs. Correspondingly, the parameter configuration system may receive the configuration parameter through the parameter configuration API, receive the service objective through the service objective API, receive the load through the load API, and receive the constraint condition through the constraint condition API.

The configuration parameter, the service objective, the load, and the constraint condition are four elements of the service system. In the method, different elements are respectively received through different APIs, so that isolation between different elements can be implemented, and security can be ensured.

In some possible implementations, standard interfaces are classified into standard input interfaces and standard output interfaces. The standard input interface is configured to input elements of the service system, such as inputting the configuration parameter, the service objective, the constraint condition, and the load. The standard output interface is configured to output the recommended parameter value of the service system. In some possible implementations, the standard input interface and the standard output interface may be a same interface, or may be different interfaces.

When the standard input interface and the standard output interface are different interfaces, isolation between input and output may be further implemented, thereby ensuring input and output security.

In some possible implementations, the parameter configuration system may output the recommended parameter value through the standard interface such as a standard output interface. The parameter configuration system may directly output the recommended parameter value to the service system through the standard interface, so as to implement automatic parameter configuration for the service system. The parameter configuration system may alternatively output the recommended parameter value to a simulator of the service system through the standard interface. When performance of the simulator meets a requirement, parameter configuration is performed for the service system based on the recommended parameter value. In this way, changes to parameters of the service system can be reduced, and reliability of the service system can be ensured.

In some possible implementations, the parameter configuration system may further determine, by using condition-based determining control logic, the parameter optimization algorithm corresponding to the configuration parameter. Specifically, the parameter configuration system may determine, according to an element of the service system, for example, any one or more of the load, the constraint condition, and the service objective of the service system, a parameter optimization algorithm corresponding to the configuration parameter by using condition-based determining control logic. In this way, the parameter configuration system may perform parameter optimization by using the parameter optimization algorithm, to obtain the recommended parameter value that meets the service objective.

The condition-based determining control logic is a control logic for determining whether a condition is met, so as to determine an execution path. In some embodiments, the condition-based determining control logic may be if-then control logic. The if-then control logic may be expressed as follows: If the element of the service system meets a specified condition, a specified parameter optimization algorithm is used to perform parameter optimization.

In this method, a parameter optimization algorithm corresponding to the configuration parameter is automatically determined by using pre-maintained condition-based determining control logic, and parameter optimization is performed based on the parameter optimization algorithm. An expert in the service field can independently complete parameter configuration without having AI experience. In this way, experts in the service field and AI field do not need to spend a lot of time and energy in communication, thereby improving configuration efficiency and reducing configuration costs.

In some possible implementations, the parameter configuration system may maintain a plurality of pieces of condition-based determining control logic in advance. These plurality of pieces of condition-based determining control logic can form a decision tree. Based on this, the parameter configuration system may determine, by using a condition-based determining decision tree (for example, an if-then decision tree), the parameter optimization algorithm corresponding to the configuration parameter.

The condition-based determining decision tree can be used to perform a plurality of judgments, comprehensively analyze the service system, and determine a proper parameter optimization algorithm, thereby improving parameter configuration efficiency and reducing parameter configuration costs.

In some possible implementations, considering that different parameter optimization methods have respective advantages and disadvantages, when parameter configuration is performed on the service system, a corresponding parameter optimization algorithm may be further selected at different stages of the service system to perform parameter configuration, so as to fully utilize advantages of different parameter configuration algorithms, thereby avoiding to the difficulty in quickly finding a proper recommended parameter value in some stages of the service system because a fixed parameter optimization algorithm is used.

Specifically, the parameter configuration system may determine a probability of the at least one parameter optimization algorithm by using the condition-based determining control logic, and determine, according to the probability of the at least one parameter optimization algorithm, the parameter optimization algorithm corresponding to the configuration parameter. In each stage of the service system, the parameter configuration system may determine the probability of at least one parameter optimization algorithm, and determine a parameter optimization algorithm whose probability meets a preset condition (for example, the probability is greater than a preset probability or the probability is the largest) as the parameter optimization algorithm used in the stage. In this way, a parameter optimization algorithm with a low probability in a current stage may still be used in a subsequent stage. Therefore, an appropriate parameter optimization algorithm can be selected in different stages, thereby meeting requirements in different stages.

In some possible implementations, considering that the configuration parameters may include a plurality of types, have different value spaces (value ranges), or are not assigned with initial values, the parameter configuration system may preprocess the configuration parameters, specifically, preprocess the configuration parameters according to attribute information of the configuration parameters, such as types and value spaces of the configuration parameters.

For example, when the types of the configuration parameters are different, the parameter configuration system may perform unified-type encoding for the configuration parameters of different types, so as to unify the types of the configuration parameters. For another example, when the value spaces (value ranges) of the configuration parameters are different, the parameter configuration system may further perform regularization on the parameters in the different value spaces, so as to unify the value spaces of the configuration parameters. For another example, when the parameter does not have an initial value, the parameter configuration system may further initialize the configuration parameter, for example, perform random initialization, so as to assign an initial value to the configuration parameter.

According to a second aspect, this application provides a parameter configuration method. The method is applied to a parameter configuration system, and the parameter configuration system is used to perform parameter configuration for a video distribution system. Specifically, the method includes the following steps: receiving a configuration parameter of a video distribution system and a service objective of the video distribution system through a standard interface; performing parameter optimization on the configuration parameter to obtain a recommended parameter value that meets the service objective; and outputting the recommended parameter value, to configure the configuration parameter.

In the method, the video distribution system is abstracted to obtain the configuration parameter and the service objective of the video distribution system. Then, the parameter configuration system receives the configuration parameter and the service objective through the standard interface, and performs parameter optimization on the configuration parameter. In this way, a parameter configuration problem in a video distribution scenario is abstracted into a mathematical problem of inputting and expression through a standard interface, so that parameter configuration can be performed in a universal manner. In this method, an expert in the video distribution field can independently complete parameter configuration without AI experience, to reduce time costs and labor costs of communication between an expert in the video distribution field and an expert in the AI field, thereby further improving configuration efficiency, and reducing configuration costs.

In some possible implementations, the configuration parameter of the video distribution system may include one or more of a group of pictures (GOP) and a bit rate. The parameter configuration system can automatically configure parameters such as the GOP and the bit rate by using this method.

In some possible implementations, the service objective of the video distribution system may be a single objective, for example, a smallest stalling time, a smallest black screen time, or a smallest first-open delay time. The service objective of the video distribution system may alternatively be a plurality of objectives. For example, a sum of a stalling time, a black screen time, and a first-open delay time is the smallest, and the first-open delay time is less than a preset delay threshold.

According to a third aspect, this application provides a parameter configuration method. The method is applied to a parameter configuration system, and the parameter configuration system is configured to perform parameter configuration for a big data processing system. Specifically, the method includes the following steps: receiving a configuration parameter of a big data processing system and a service objective of the big data processing system through a standard interface; performing parameter optimization on the configuration parameter to obtain a recommended parameter value that meets the service objective; and outputting the recommended parameter value, to configure the configuration parameter.

In the method, the big data processing system is abstracted to obtain the configuration parameter and the service objective of the big data processing system. Then, the parameter configuration system receives the configuration parameter and the service objective through the standard interface, and performs parameter optimization on the configuration parameter. In this way, a parameter configuration problem in a big data processing scenario is abstracted into a mathematical problem of inputting and expression through a standard interface, so that parameter configuration can be performed in a universal manner. In this method, an expert in the big data processing field can independently complete parameter configuration without AI experience, to reduce time costs and labor costs of communication between an expert in the big data processing field and an expert in the AI field, thereby further improving configuration efficiency, and reducing configuration costs.

In some possible implementations, the configuration parameter of the big data processing system may include any one or more of a buffer capacity, a degree of parallelism, or a compression policy. In this way, the parameter configuration system can implement automatic configuration of parameters such as the buffer capacity, the degree of parallelism, and the compression policy by using the method.

In some possible implementations, the service objective of the big data processing system may be a fastest processing speed or a shortest execution time.

According to a fourth aspect, this application provides a parameter configuration system. The system includes: an interface module, configured to receive a configuration parameter of a service system and a service objective of the service system through a standard interface; and a parameter optimization module, configured to perform parameter optimization on the configuration parameter to obtain a recommended parameter value that meets the service objective, where the interface module is further configured to output the recommended parameter value, to configure the configuration parameter.

In some possible implementations, the interface module is further configured to: receive at least one of load and a constraint condition through the standard interface.

The performing parameter optimization on the configuration parameter to obtain the recommended parameter value that meets the service objective includes: performing parameter optimization on the configuration parameter based on at least one of the load and the constraint condition, to obtain the recommended parameter value that meets the service objective.

In some possible implementations, the standard interface includes an application programming interface API.

In some possible implementations, the standard interface includes a configuration parameter API, a service objective API, a load API, and a constraint condition API.

In some possible implementations, the system further includes: a control module, configured to determine, by using condition-based determining control logic, a parameter optimization algorithm corresponding to the configuration parameter.

In some possible implementations, the control module is specifically configured to: determine, by using a condition-based determining decision tree, the parameter optimization algorithm corresponding to the configuration parameter.

In some possible implementations, the control module is specifically configured to: determine a probability of at least one parameter optimization algorithm by using the condition-based determining control logic; and determine, according to the probability of the at least one parameter optimization algorithm, the parameter optimization algorithm corresponding to the configuration parameter.

In some possible implementations, the system further includes: a parameter preprocessing module, configured to preprocess the configuration parameter.

According to a fifth aspect, this application provides a device. The device includes a processor and a memory. The processor and the memory communicate with each other. The processor is configured to execute instructions stored in the memory, so that the device performs the method according to any one of the implementations of the first aspect, the second aspect, or the third aspect.

According to a sixth aspect, this application provides a computer-readable storage medium. The computer-readable storage medium stores instructions, and the instructions instruct a device to perform the method according to any one of the implementations of the first aspect, the second aspect, or the third aspect.

According to a seventh aspect, this application provides a computer program product including instructions. When instructions are run on a device, the device is enabled to perform the method according to any one of the implementations of the first aspect, the second aspect, or the third aspect.

Based on the implementations provided in the foregoing aspects, this application may further provide more implementations by further combination.

BRIEF DESCRIPTION OF DRAWINGS

To describe the technical methods in embodiments of this application more clearly, the following briefly describes the accompanying drawings used in describing the embodiments.

DESCRIPTION OF EMBODIMENTS

Figure 1:
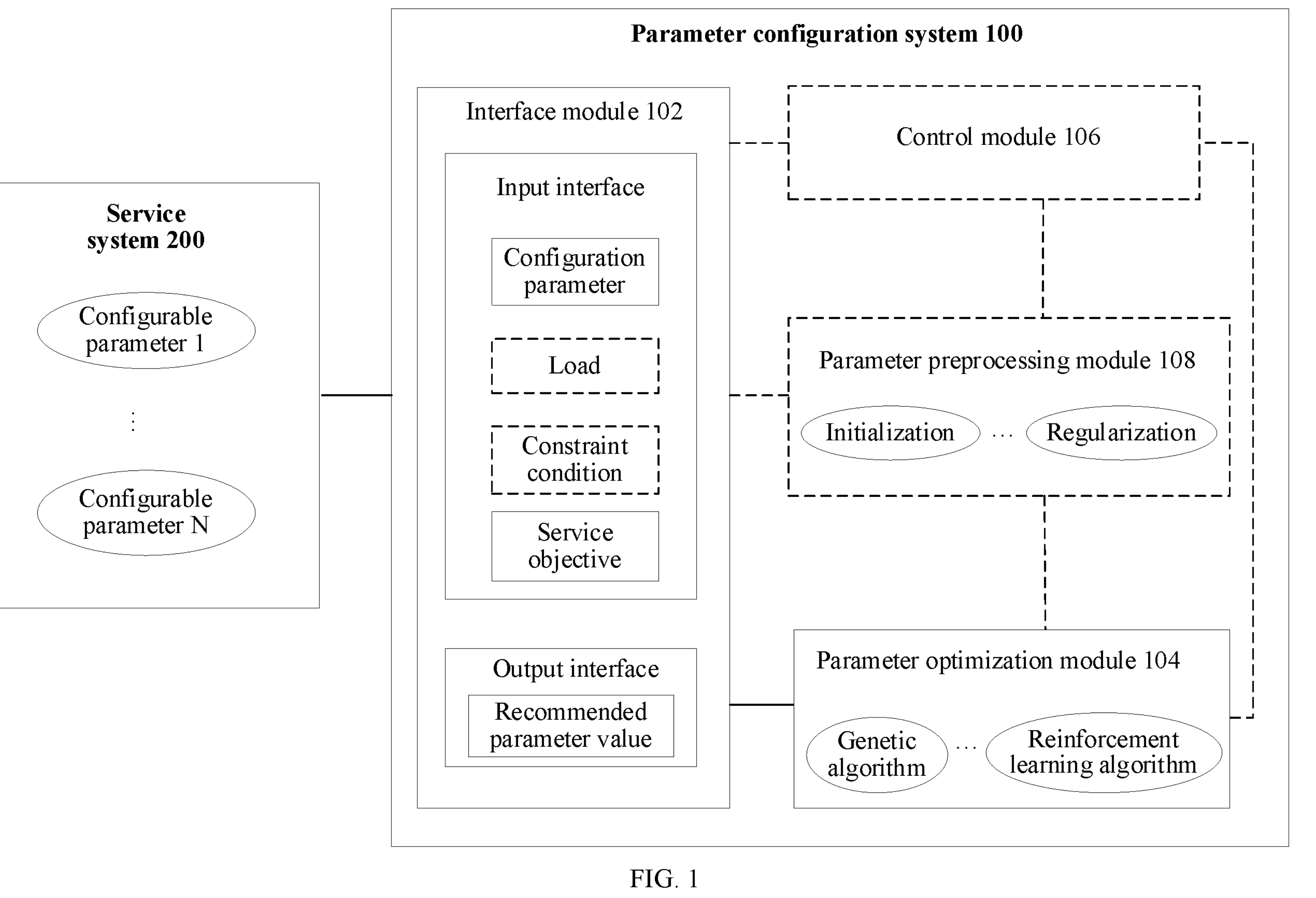
FIG. 1 is a system architecture diagram of a parameter configuration system according to an embodiment of this application.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly indicate or implicitly include one or more such features.

Some technical terms used in embodiments of this application are first described.

An IT facility, also referred to as an IT infrastructure, is a facility used to support IT services. A complete set of IT facilities include a plurality of IT components. The IT component specifically includes bottom-layer hardware and upper-layer software. The bottom-layer hardware may include a computing platform, a storage platform, a network communication platform, and the like. The upper-layer software may include software running on the foregoing platform, such as an operating system and application software. IT components in these IT facilities have a large quantity of configurable parameters.

Parameter optimization means searching value spaces of the configurable parameters for an appropriate parameter value to optimize performance of IT facilities. In many scenarios, for example, in a video distribution service scenario and a big data analysis service scenario, parameter optimization needs to be performed on an IT facility (which may be specifically an IT component in the IT facility).

Currently, a plurality of methods are provided in the industry to implement parameter optimization. These methods may be roughly classified into the following types: (1) a heuristic method represented by a genetic algorithm; (2) a statistical modeling method represented by a Bayesian algorithm; and (3) a real-time dynamic adjustment method represented by reinforcement learning.

However, in these methods, parameter optimization is usually performed for a specific problem, that is, parameter optimization is performed in a case-by-case manner. When parameter optimization is performed for a service scenario, experts in the service field and the artificial intelligence (AI) field are required for long-term and sufficient communication. As a result, parameter configuration efficiency is low, and parameter configuration costs are very high.

In view of this, an embodiment of this application provides a parameter configuration method. The method may be performed by a parameter configuration system. Specifically, the parameter configuration system receives a configuration parameter of a service system and a service objective of the service system through a standard interface, then performs parameter optimization on the configuration parameter to obtain a recommended parameter value that meets the service objective, and then outputs the recommended parameter value to configure the configuration parameter.

In this method, parameter configuration problems in different service scenarios are abstracted into a mathematical problem of inputting and expression through a standard interface, to provide a universal parameter configuration method, without case-by-case parameter configuration. In addition, in the method, parameter optimization may be automatically performed according to inputting through the interface, to obtain the recommended parameter value. In this way, an expert in the service field can independently complete parameter configuration without AI experience, to reduce time costs and labor costs of communication between an expert in the service field and an expert in the AI field, thereby further improving configuration efficiency, and reducing configuration costs.

The parameter configuration system in this embodiment of this application may be configured to configure parameters of a service system such as a video distribution system or a big data processing system, so that the service system has good performance. The following describes a system architecture of the parameter configuration system with reference to the accompanying drawings.

Refer to the system architecture diagram of the parameter configuration system shown in FIG. 1. As shown in FIG. 1, the parameter configuration system 100 includes an interface module 102 and a parameter optimization module 104. The service system 200 has a plurality of configurable parameters. For example, the service system 200 has a configurable parameter 1 to a configurable parameter N, where N is a positive integer. The parameter configuration system 100 is configured to configure at least one of the configurable parameter 1 to the configurable parameter N.

Specifically, the interface module 102 of the parameter configuration system 100 is configured to receive a configuration parameter of the service system 200 and a service objective of the service system 200 through a standard interface, and the parameter optimization module 104 is configured to perform parameter optimization on the configuration parameter to obtain a recommended parameter value that meets the service objective. Correspondingly, the interface module 102 is further configured to output the recommended parameter value, to configure the configuration parameter.

The configuration parameter may be at least one of configurable parameters of the service system 200, and the configuration parameter may be specifically determined by a user (for example, an expert in the service field) from configurable parameters. The service objective is a requirement of at least one KPI specified based on requirements of the service system.

For example, in a video distribution scenario, the configuration parameter may include parameters such as a GOP and a bit rate, and the KPI may include one or more of a stalling time, a black screen time, and a first-open delay time. In some embodiments, the KPI may further include a sum of the foregoing at least two indicators. Based on this, the service objective may be a single objective, for example, may be a smallest stalling time, a smallest black screen time, or a smallest first-open delay time. In some possible implementations, the service objective may alternatively be a plurality of objectives. For example, a sum of a stalling time, a black screen time, and a first-open delay time is the smallest, and the first-open delay time is less than a preset delay threshold.

For another example, in a big data processing scenario, the configuration parameter may include parameters such as a buffer capacity, a degree of parallelism, and a compression policy, and the KPI may include a processing speed. Based on this, the service objective may be a fastest processing speed.

In some possible implementations, the interface module 102 is further configured to receive at least one of load and a constraint condition of the service system 200 through the standard interface. The load of the service system 200 may include environment load and service load. The environment load is used to describe software and hardware facilities of the service system, for example, describe an operating system type, a computing platform type, a deployment manner, and the like that are used by the service system. The service load is used to describe service data, for example, describe a data amount, data distribution, and the like of the service data. The constraint condition is specifically a condition that needs to be met for parameter optimization of the service system. For example, when the configuration parameter is a hot parameter (a parameter with a high update frequency), the constraint condition may be real-time parameter optimization. When the configuration parameter is a cold parameter (a parameter with a low update frequency), the constraint condition may be offline parameter optimization. Further, when costs of parameter verification are high, the constraint condition may alternatively be that a quantity of verification times is less than a preset quantity of times.

When the interface module 102 receives the at least one of the load and the constraint condition, the parameter optimization module 104 is specifically configured to perform parameter optimization on the configuration parameter based on the at least one of the load and the constraint condition. Specifically, the parameter optimization module 104 may perform parameter optimization by using a parameter optimization algorithm determined based on at least one of the load and the constraint condition. For example, when a service load variable indicates that a service type is a machine learning type, a parameter optimization algorithm matching the service type includes a reinforcement learning algorithm, and the parameter optimization module 104 may perform parameter optimization by using the reinforcement learning algorithm. For another example, when the constraint condition is that precision is higher than preset precision, an algorithm matching the constraint condition may be a random probability search algorithm, where the random probability search algorithm may include a genetic algorithm. When the constraint condition is that the quantity of verification times is less than the preset quantity of times, an algorithm matching the constraint condition may be a probability modeling search algorithm, where the probability modeling search algorithm may include a Bayesian algorithm.

In some embodiments, the parameter optimization module 104 may alternatively perform parameter optimization by using a parameter optimization algorithm determined based on the service objective or the configuration parameter. For example, when the service objective is a single objective, the algorithm matching the service objective includes the random probability search algorithm and the probability modeling search algorithm, and the parameter optimization module 104 may perform parameter optimization by using the random probability search algorithm or the probability modeling search algorithm, to obtain a recommended parameter value. For another example, when the service objective is a plurality of objectives, the algorithm matching the service objective includes the random probability search algorithm, and the parameter optimization module 104 may perform parameter optimization by using the random probability search algorithm, to obtain a recommended parameter value.

In some possible implementations, the parameter configuration system 100 may further include a control module 106. The control module 106 is configured to determine, by using the condition-based determining control logic, a parameter optimization algorithm corresponding to the configuration parameter. In this way, the parameter optimization module 104 may invoke a corresponding algorithm model according to the parameter optimization algorithm determined by the control module 106, to perform parameter optimization on the configuration parameter.

The condition-based determining control logic is control logic for determining whether a condition is met, so as to determine an execution path. In some embodiments, the condition-based determining control logic may be if-then control logic. For ease of description, in this embodiment of this application, the configuration parameter, the service objective, the load, and the constraint condition are referred to as elements of the service system 200. Based on this, the if-then control logic may be expressed as follows: If an element of the service system 200 meets a specified condition, a specified parameter optimization algorithm is used to perform parameter optimization.

Considering that configuration parameters may include a plurality of types, have different value spaces (value ranges), or are not assigned with initial values, the parameter configuration system 100 may further include a parameter preprocessing module 108. The parameter preprocessing module 108 is configured to preprocess the configuration parameters, for example, perform unified-type coding for different types of parameters, so as to unify the types of the configuration parameters, and perform regularization for parameters in different value spaces, so as to unify the value spaces of the configuration parameters, or initialize the parameters, for example, perform random initialization, so as to assign initial values to the configuration parameters.

In some possible implementations, the control module 106 may determine a preprocessing manner of the configuration parameter based on attribute information of the configuration parameter, for example, the type and the value space of the configuration parameter, and transmit the preprocessing manner to the parameter preprocessing module 108. The parameter preprocessing module 108 may preprocess the configuration parameter in the preprocessing manner determined by the control module 106.

Correspondingly, the parameter optimization module 104 may perform parameter optimization after the parameter preprocessing module 108 preprocesses the configuration parameter. The parameter optimization module 104 may invoke a corresponding algorithm model such as a genetic algorithm model, a Bayesian algorithm model, or a reinforcement learning algorithm model according to the parameter optimization algorithm that is determined by the control module 106 and that corresponds to the configuration parameter, to perform parameter optimization, to obtain the recommended parameter value.

Further, the interface module 102 may further obtain the recommended parameter value of the configuration parameter from the parameter optimization module 104, and then output the recommended parameter value through the standard interface, so as to perform parameter configuration for the configuration parameter. In some embodiments, the interface module 102 may directly output the recommended parameter value of the configuration parameter to the service system 200, thereby implementing automatic parameter configuration for the service system 200. In some other embodiments, the interface module 102 may alternatively output the recommended parameter value of the configuration parameter to a simulator of the service system 200. When performance of the simulator meets a requirement, parameter configuration is performed for the service system 200 based on the recommended parameter value. In this way, changes to parameters of the service system 200 can be reduced, and reliability of the service system 200 can be ensured.

It should be noted that the parameter configuration system 100 may be a software system. In some embodiments, the software system may be deployed on a terminal side (that is, a local device side, for example, a device side such as a user terminal directly controlled by a user). In some other embodiments, the software system may be deployed on a cloud side, for example, deployed on a public cloud.

Figure 2A:
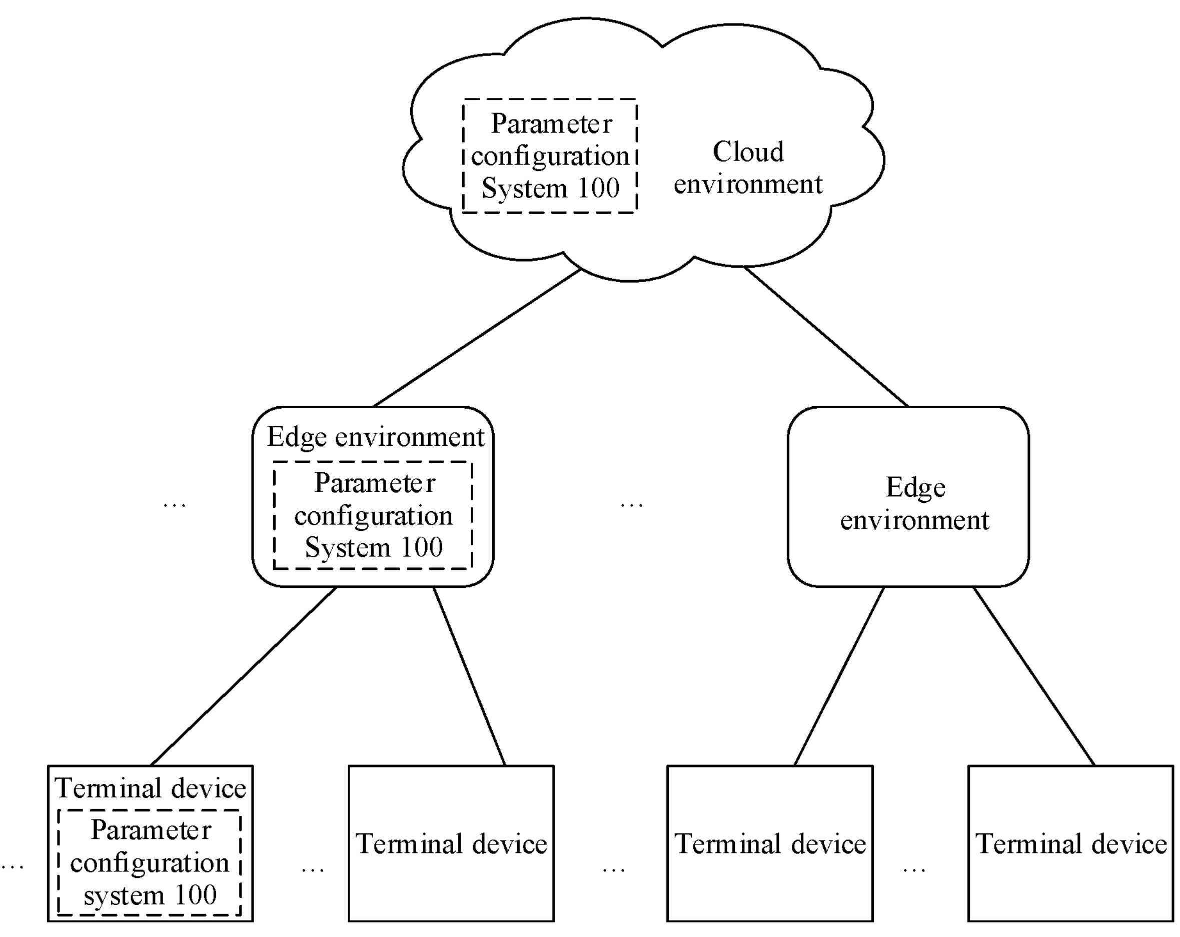
FIG. 2A is a diagram of an application scenario of a parameter configuration system according to an embodiment of this application.

As shown in FIG. 2A, various parts (such as the interface module 102, the parameter optimization module 104, the control module 106, and the parameter preprocessing module 108) of the parameter configuration system 100 may be centrally deployed in a cloud environment, and specifically, in one or more computing devices (such as a central server) in the cloud environment. The various parts of the parameter configuration system 100 may alternatively be centrally deployed in an edge environment, and specifically, in one or more computing devices (edge computing devices) in the edge environment. The edge computing device may be a server, a computing box, or the like. The cloud environment indicates a central computation device cluster owned by a cloud service provider and configured to provide computation, storage, and communication resources. The edge environment indicates an edge computation device cluster geographically close to a terminal device (namely, a terminal-side device) and configured to provide computation, storage, and communication resources.

In some possible implementations, the various parts of the parameter configuration system 100 may be also centrally deployed on a terminal device. The terminal device includes but is not limited to a user terminal such as a desktop computer, a notebook computer, or a smartphone. By running the parameter configuration system 100 on these user terminals, parameter configuration for the service system 200 may be implemented.

When the parameter configuration system 100 is deployed in the cloud environment or the edge environment, the parameter configuration system 100 may be provided for the user for use in a form of a service. Specifically, the user may access the cloud environment or the edge environment by using a browser, create an instance of the parameter configuration system 100 in the cloud environment or the edge environment, and then interact with the instance of the parameter configuration system 100 by using the browser, to implement parameter configuration. When the parameter configuration system 100 is deployed on the terminal device, the parameter configuration system 100 may be provided for the user in a form of an installation package. Specifically, the terminal device obtains the installation package of the parameter configuration system 100, and runs the installation package, so that the parameter configuration system 100 is installed on the terminal device. The terminal device implements parameter configuration by running the parameter configuration system 100.

It should be noted that when the parameter configuration system 100 is provided for the user in a form of a cloud service, the parameter configuration system 100 may be provided for the user in a form of an independent cloud service. In this way, traffic diversion for the cloud service can be implemented. In some embodiments, the parameter configuration system 100 may also be used in cooperation with an existing cloud service, for example, may be used as a background module to enhance a function of an existing cloud service. Certainly, when the parameter configuration system 100 is provided for the user in a form of a non-cloud service, the parameter configuration system 100 may be further used as an embedded module, for example, a plug-in, to enhance performance of an existing product such as a mobile phone, a base station, or a server.

Figures 2B, 3:
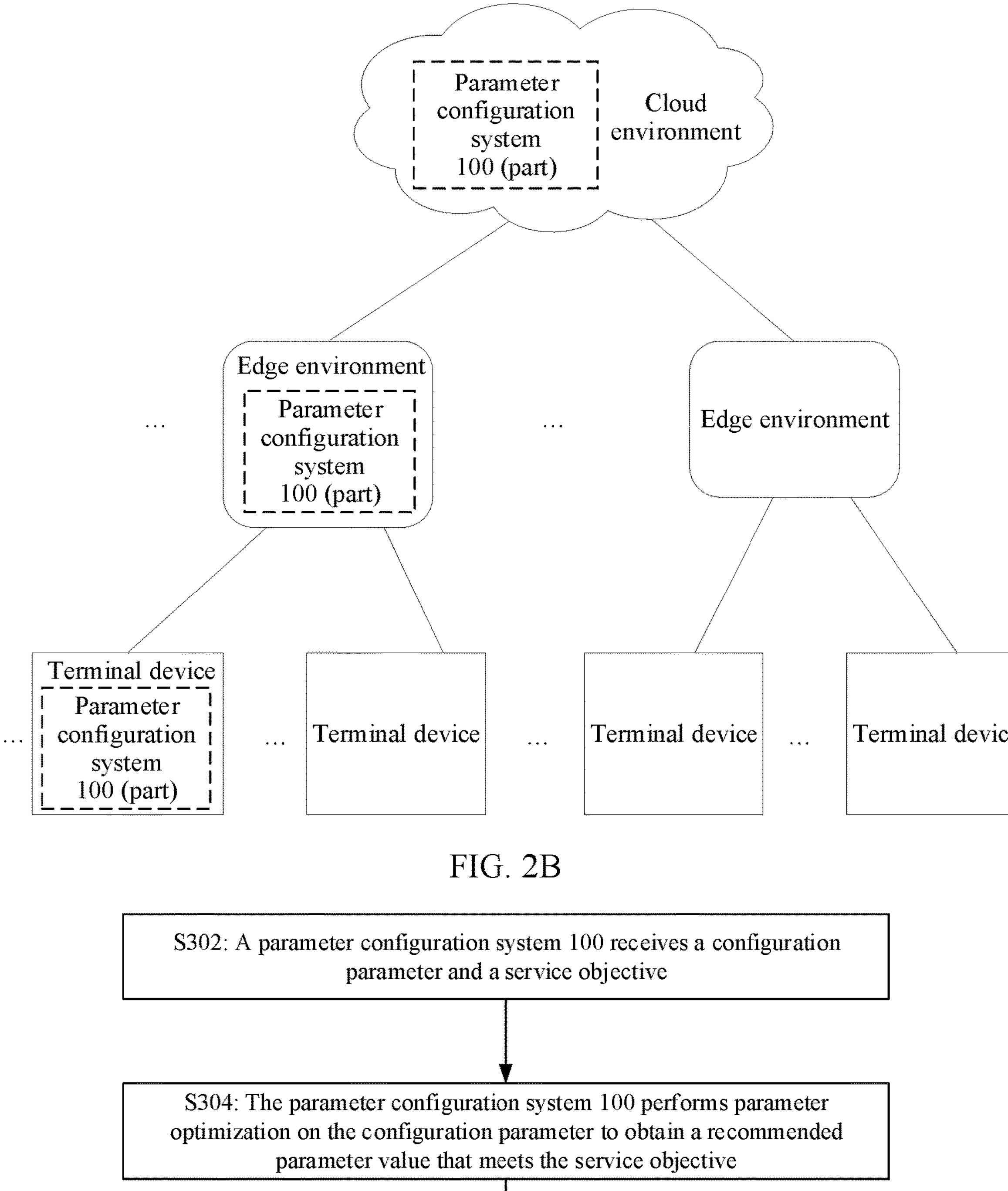
FIG. 2B is a diagram of an application scenario of a parameter configuration system according to an embodiment of this application.
FIG. 3 is a flowchart of a parameter configuration method according to an embodiment of this application.

As shown in FIG. 2B, various parts of the parameter configuration system 100 may also be deployed in different environments in a distributed manner. For example, a part of the parameter configuration system 100 may be separately deployed in three environments or any two of the cloud environment, the edge environment, and the terminal device.

FIG. 2A and FIG. 2B merely show some deployment manners of the parameter configuration system 100. In another possible implementation of this embodiment of this application, the parameter configuration system 100 may be deployed in another manner. Details are not described herein.

The following describes the parameter configuration method provided in embodiments of this application from the perspective of the parameter configuration system 100.

Refer to a flowchart of a parameter configuration method shown in FIG. 3. The method includes the following steps.

S302: A parameter configuration system 100 receives a configuration parameter of a service system 200 and a service objective of the service system 200 through a standard interface.

Specifically, the configuration parameter and the service objective of the service system 200 may be carried in a parameter configuration requirement. The parameter configuration system 100 receives the parameter configuration requirement through the standard interface, so as to receive the configuration parameter and the service objective. The parameter configuration requirement is specifically used to indicate the parameter configuration system 100 to search value spaces of the configuration parameter for an appropriate parameter value, so as to achieve the service objective.

In some possible implementations, the parameter configuration system 100 may further receive at least one of load and a constraint condition of the service system 200 through the standard interface. Correspondingly, the parameter configuration system 100 searches the value spaces of the configuration parameter for a proper parameter value under the current load and the current constraint condition, to achieve the foregoing service objective.

The standard interface means a standardized and normalized interface. In some embodiments, the standard interface may include a standard API. When receiving elements of the service system 200 such as the configuration parameter, the service objective, the load, and the constraint condition, the parameter configuration system 100 may receive the elements through one API, or may receive the elements through APIs corresponding to the elements.

In some embodiments, the parameter configuration system 100 may receive the configuration parameter of the service system 200 through a parameter configuration API, receive the service objective of the service system 200 through a service objective API, receive the load of the service system 200 through a load API, and receive the constraint condition of the service system 200 through a constraint condition API.

The configuration parameter is at least one parameter determined from configurable parameters of the service system 200. The configuration parameter may be defined according to a specified format, for example, according to a format specified by the standard interface. In some possible implementations, the configuration parameter may be defined according to a format of the API. For example, the configuration parameter can be defined by using fields such as parameter name, parameter type, and parameter value space. Considering that some configuration parameters further have initial values, in some embodiments, the configuration parameter may be further defined by using the initial value.

For ease of understanding, the following describes the configuration parameter with reference to some specific examples.

For example, a parameter 1 may be defined by using fields such as a parameter name, a parameter type, a value space of the parameter, and an initial value, which are specifically as follows: degree of parallelism, discrete type, 1 to 100, 10.

The degree of parallelism is the parameter name of the parameter 1, the parameter type of the degree of parallelism parameter is a discrete type, the value space is 1 to 100, and the initial value is 10.

For another example, a parameter 2 may be defined by using fields such as a parameter name, a parameter type, and a value space of the parameter, which are specifically as follows: serialization policy, enumeration type, [yes, no].

The serialization policy is the parameter name of the parameter 2, the enumeration type is the parameter type of the serialization policy parameter, and the value space of the serialization policy parameter includes two values: yes and no.

The service objective is specifically used to describe an expectation of performance of the service system 200. The service objective may be defined by using a key performance indicator of the service system 200. For example, in a big data processing service scenario, the key performance indicator may be a processing speed or an execution time. Based on this, the service objective may be a fastest processing speed or a shortest execution time.

Similar to the configuration parameter, the service objective may also be defined in a standard API format. In this way, the parameter configuration system 100 (for example, the interface module 102) may receive, through the API, the configuration parameter and the service objective that are defined according to the standard API format. Specifically, the parameter configuration system 100 may receive the configuration parameter and the service objective through the API corresponding to the configuration parameter and the service objective.

The load is specifically used to describe an environment or service data of the service system 200. The load can be expressed by using load variables. In some embodiments, the load variables include a plurality of types such as an environment load variable and a service load variable. The environment load variable and the service load variable may be defined according to a standard interface format, for example, an API format.

For ease of understanding, the following describes the load variable with reference to some specific examples.

For example, an environment load variable 1 may be defined by using a variable name, a variable type, and a variable value, which are specifically as follows: chip type, enumeration type, CPU and GPU.

The chip type is used to indicate the variable name of the environment load variable 1, that is, the environment load variable 1 is the chip type, the variable type of the chip type variable is the enumeration type, and variable values of the variable are a CPU and a GPU, that is, hardware facilities of a current service system include the CPU and the GPU.

For another example, a service load variable 1 and a service load variable 2 each may be defined by using a variable name, a variable type, and a variable value, which are specifically as follows: data scale, continuous type, 10 GB; and service type, enumeration type, SQL, machine learning type, and stream processing type.

The data scale is used to indicate the variable name of the service load variable 1. The variable type of the variable is a continuous type, and the variable value of the variable is 10 gigabytes (GB). The service type is used to indicate the variable name of the service load variable 2. The variable type of the variable is an enumeration type, and the variable value of the variable may be SQL, machine learning type, and stream processing type.

The constraint condition is specifically a condition that needs to be met for parameter optimization of the service system. For example, when the configuration parameter is a hot parameter (a parameter with high update frequency), the constraint condition may be real-time parameter optimization. When the configuration parameter is a cold parameter (a parameter with low update frequency), the constraint condition may be offline parameter optimization. Further, when costs of parameter verification are high, the constraint condition may alternatively be that a quantity of verification times is less than a preset quantity of times. The constraint condition may also be defined in the standard API format.

Each service system 200 may be described by using at least two of the foregoing four elements. Therefore, the parameter configuration system 100 may perform unified parameter configuration according to the foregoing elements obtained by abstraction, thereby providing a universal parameter configuration method.

S304: The parameter configuration system 100 performs parameter optimization on the configuration parameter to obtain a recommended parameter value that meets the service objective.

Specifically, the parameter configuration system 100 (for example, a control module 106) may determine, by using preset condition-based determining control logic, the parameter optimization algorithm corresponding to the configuration parameter, and then the parameter configuration system 100 (for example, a parameter optimization module 104) performs parameter optimization on the configuration parameter based on the parameter optimization algorithm, to obtain the recommended parameter value that meets the service objective.

In this embodiment, the condition-based determining control logic is specifically control logic for determining whether a condition is met, so as to determine an execution path, and may be, for example, if-then control logic. The if-then control logic may be expressed as follows: If an element (a configuration parameter, a service objective, load, or a constraint condition) of the service system 200 meets a specified condition, a specified parameter optimization algorithm is used to perform parameter optimization.

For example, the if-then control logic may include: If the constraint condition is that the quantity of verification times is less than the preset quantity of times (the constraint condition is a high-cost verification type), parameter optimization is performed by using a probability modeling search algorithm such as a Bayesian algorithm. For another example, the if-then control logic may include: If the constraint condition is parameter optimization in real time, parameter optimization is performed by using a reinforcement learning algorithm.

Further, considering that configuration parameters may have different parameter types, have different value spaces, or have no initial values, the parameter configuration system 100 may further determine a preprocessing manner for the configuration parameters according to attribute information of the configuration parameters. The parameter configuration system 100 (for example, the control module 106) may determine, according to the attribute information of the configuration parameter, for example, according to any one or more of the attribute information such as the type and the value space of the configuration parameter, a preprocessing method corresponding to the configuration parameter by using the preset condition-based determining control logic. The condition-based determining control logic may be if-then control logic.

Based on this, the if-then control logic may be expressed as follows: If an element of the service system 200 meets a specified condition, the configuration parameter is preprocessed in a specified preprocessing manner. For example, the if-then control logic may include: If parameter types of the configuration parameters are different, unified-type encoding is performed on the configuration parameters. For another example, the if-then control logic may include: If value spaces of the configuration parameters are different, the configuration parameters are regularized. Certainly, the if-then control logic may also include: If the configuration parameter does not have an initial value, the configuration parameter is initialized, for example, random initialization is performed.

For ease of understanding, the following uses a big data processing scenario as an example for description.

Figure 4:
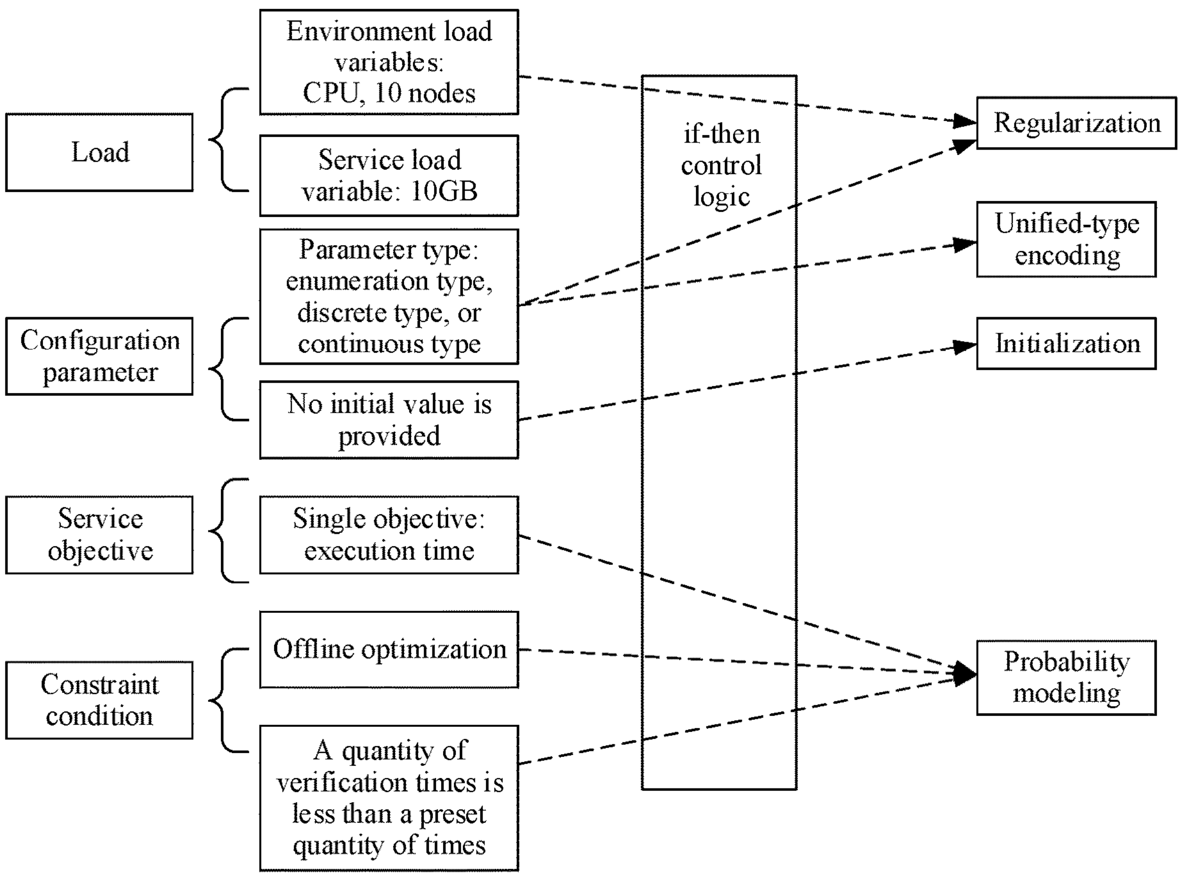
FIG. 4 is a schematic flowchart of a parameter configuration method according to an embodiment of this application.

Refer to a schematic flowchart of a parameter configuration method shown in FIG. 4. As shown in FIG. 4, elements of a service system 200 include load, a configuration parameter, a service objective, and a constraint condition. Load variables include environment load variables and service load variables. The environment load variables include a chip type and a node quantity. In this example, the chip type is CPU, and the node quantity is 10. The service load variables include a data scale. In this example, the data scale is specifically 10 GB. Definitions of the configuration parameter include a parameter name, a parameter type, and a value space. In this example, the parameter type includes an enumeration type, a discrete type, and a continuous type, and no initial value is provided for the configuration parameter. The service objective is a single objective, and may be specifically that an execution time is the shortest. The constraint condition is that parameter optimization is performed offline, and a quantity of verification times is less than a preset quantity of times.

A control module 106 determines, based on if-then control logic, whether the foregoing elements meet a specified condition, so as to determine a corresponding preprocessing manner and parameter optimization algorithm. Specifically, the load variable and the configuration parameter may be variables of different types, and these variables may have different value spaces. The control module 106 may determine, based on the if-then control logic, to perform unified-type encoding and regularization on the configuration parameter, so as to preprocess variables of different types and different value spaces. Further, no initial value is provided for the configuration parameter, and the control module 106 determines, based on the if-then control logic, to initialize the configuration parameter. Because the constraint condition is that parameter optimization is performed offline, and the quantity of verification times is less than the preset quantity of times, there is no higher requirement for precision. The control module 106 determines, based on the if-then control logic, to use a probability modeling search algorithm model (for example, a Bayesian algorithm model) to perform parameter optimization.

The parameter configuration system 100 (for example, the parameter optimization module 104) provides algorithm models having a plurality of parameter optimization algorithms. The parameter optimization algorithms are classified into offline algorithms and online algorithms. The offline algorithms include the Bayesian algorithm, a genetic algorithm, and the like. The online algorithms include a reinforcement learning algorithm, a multi-arm machine algorithm, and the like. The online algorithm can implement real-time optimization. The parameter configuration system 100 (for example, the parameter optimization module 104) may invoke a corresponding algorithm model according to the parameter optimization algorithm determined by the control module 106, to perform parameter optimization.

In some possible implementations, the parameter configuration system 100 (for example, a parameter preprocessing module 108) may further invoke a corresponding preprocessing unit (for example, a unified-type encoding unit, a regularization unit, or an initialization unit) according to the preprocessing manner that is determined by the control module 106 for the configuration parameter, to preprocess the configuration parameter. The parameter optimization module 104 performs parameter optimization on the preprocessed parameter to obtain a recommended parameter value.

S306: The parameter configuration system 100 outputs the recommended parameter value, to configure the configuration parameter.

Specifically, the parameter configuration system 100 provides a standard interface, and the parameter configuration system 100 may output the recommended parameter value based on the standard interface such as an API. Standard interfaces may be classified into standard input interfaces and standard output interfaces. The standard input interface is configured to input elements of the service system 200, and the standard output interface is configured to output the recommended parameter value of the service system 200. In some possible implementations, the standard input interface and the standard output interface may be a same interface, or may be different interfaces. This is not limited in this embodiment of this application.

When outputting the recommended parameter value, the parameter configuration system 100 may directly output the recommended parameter value to the service system 200, so as to implement parameter configuration for the service system 200. In some embodiments, the parameter configuration system 100 may alternatively output the recommended parameter value to a simulator of the service system 200. When performance obtained after the simulator performs configuration according to the recommended parameter value meets a requirement, the recommended parameter value may be output to the service system 200, so as to implement parameter configuration for the service system 200.

In some possible implementations, when the parameter configuration system 100 outputs the recommended parameter value to the service system 200 or the simulator of the service system 200, the parameter configuration system 100 may further determine an indicator value of a key performance indicator of the service system 200 or the simulator of the service system 200, and then perform a next iteration based on the indicator value. That is, the parameter configuration system 100 may repeatedly perform the S302 to S306. In this way, the indicator value of the key performance indicator of the service system 200 may be continuously increased. When the indicator value of the key performance indicator is maximized, the service system 200 achieves the service objective, and the parameter configuration system 100 determines a parameter value of this iteration as the recommended parameter value of the configuration parameter.

Based on the foregoing content description, an embodiment of this application provides a parameter configuration method. In this method, parameter configuration problems in different service scenarios are abstracted into a mathematical problem of inputting and expression through a standard interface, to provide a universal parameter configuration method, without case-by-case parameter configuration. In addition, in the method, a parameter optimization algorithm corresponding to the configuration parameter may be automatically determined according to inputting through the interface, and parameter optimization is performed by using the parameter optimization algorithm, to obtain the recommended parameter value. In this way, an expert in the service field can independently complete parameter configuration without AI experience, to reduce time costs and labor costs of communication between an expert in the service field and an expert in the AI field, thereby further improving configuration efficiency, and reducing configuration costs.

In the embodiment shown in FIG. 3, a key for the parameter configuration system 100 to perform parameter configuration for the service system 200 is that the control module 106 determines the preprocessing manner and/or the parameter optimization algorithm for the configuration parameter. The control module 106 may determine the preprocessing manner and/or the parameter optimization algorithm for the configuration parameter by using pre-maintained condition-based determining control logic, for example, if-then control logic.

The control module 106 may maintain a plurality of condition-based determining control logics, and the plurality of condition-based determining control logics may form a decision tree. Correspondingly, the control module 106 may determine, by using a condition-based determining decision tree, the preprocessing manner and/or the parameter optimization algorithm corresponding to the configuration parameter.

For ease of understanding, an example in which the if-then decision tree is used to determine the preprocessing manner corresponding to the configuration parameter is used below for description.

Figure 5:
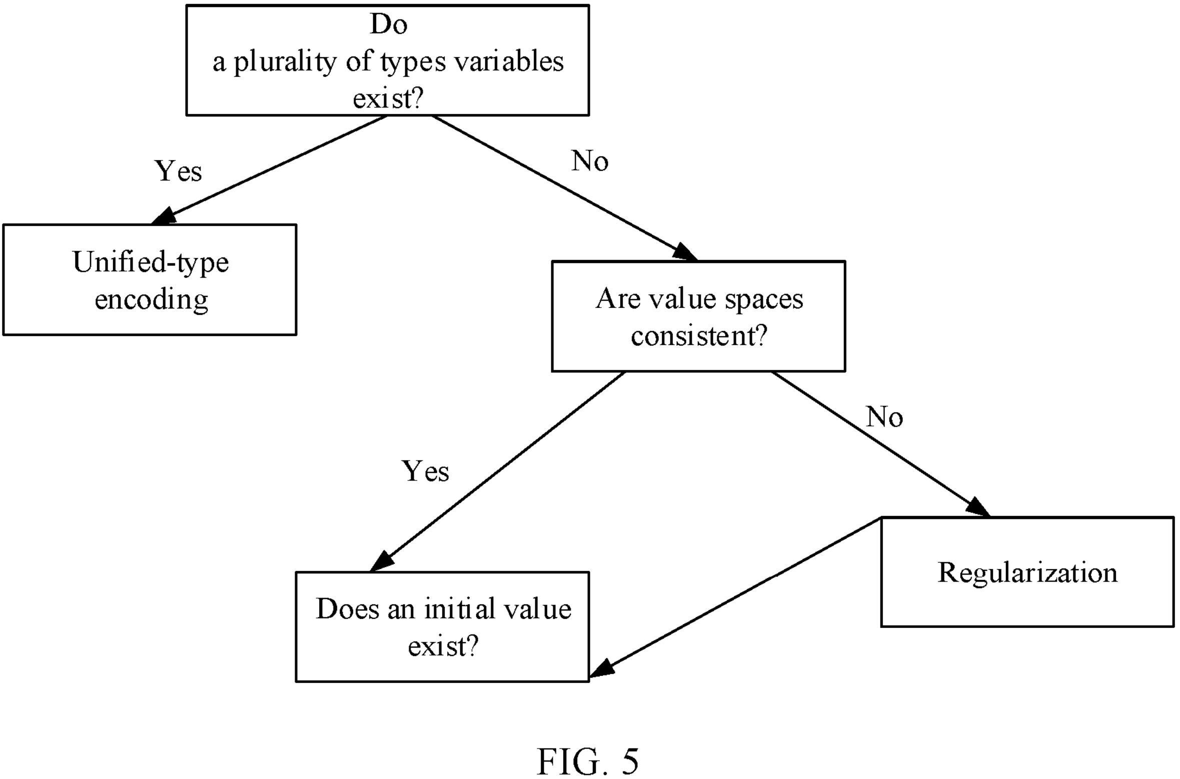
FIG. 5 is a schematic diagram of a decision tree according to an embodiment of this application.

Refer to a schematic diagram of a decision tree shown in FIG. 5. As shown in FIG. 5, the decision tree includes at least three layers of control logic. Specifically, a control module 106 first determines whether configuration parameters and load variables (including an environment load variable and a service load variable) include a plurality of types. If the configuration parameters and the load variables include a plurality of types, the control module 106 determines to perform unified-type encoding on the configuration parameter. If the configuration parameters and the load variables not include a plurality of types, the control module 106 continues to determine whether a value space of the configuration parameter is consistent with a value space of the load variable. If the value space of the configuration parameter is inconsistent with the value space of the load variable, the control module 106 determines to perform regularization on the configuration parameter. If the value space of the configuration parameter is consistent with the value space of the load variable, the control module 106 continues to determine whether the configuration parameter has an initial value. If the configuration parameter has no initial value, the control module 106 determines to initialize the configuration parameter. In some embodiments, the control module 106 may further perform feature selection based on an input configuration parameter.

Considering that different parameter optimization methods have their respective advantages and disadvantages, when parameter configuration is performed on the service system 200, corresponding parameter optimization algorithms may be further selected in different stages of the service system 200 to perform parameter configuration. Specifically, the parameter configuration system 100 (for example, the control module 106) may determine a probability of the at least one parameter optimization algorithm by using the condition-based determining control logic, and then determine, according to the probability of the at least one parameter optimization algorithm, a parameter optimization algorithm corresponding to the configuration parameter.

In some possible implementations, the control module 106 determines the probability of at least one parameter optimization algorithm in each stage, and determines a parameter optimization algorithm whose probability meets a preset condition (for example, the probability is greater than a preset probability or the probability is the largest) as the parameter optimization algorithm used in the stage. In this way, a parameter optimization algorithm with a low probability in a current stage may still be used in a subsequent stage, so that the control module 106 can select appropriate parameter optimization algorithms in different stages, thereby meeting requirements in different stages.

For ease of understanding, an example in which the parameter optimization algorithm corresponding to the configuration parameter is determined by using probability-based if-then control logic is used below for description.

Figures 6, 7:
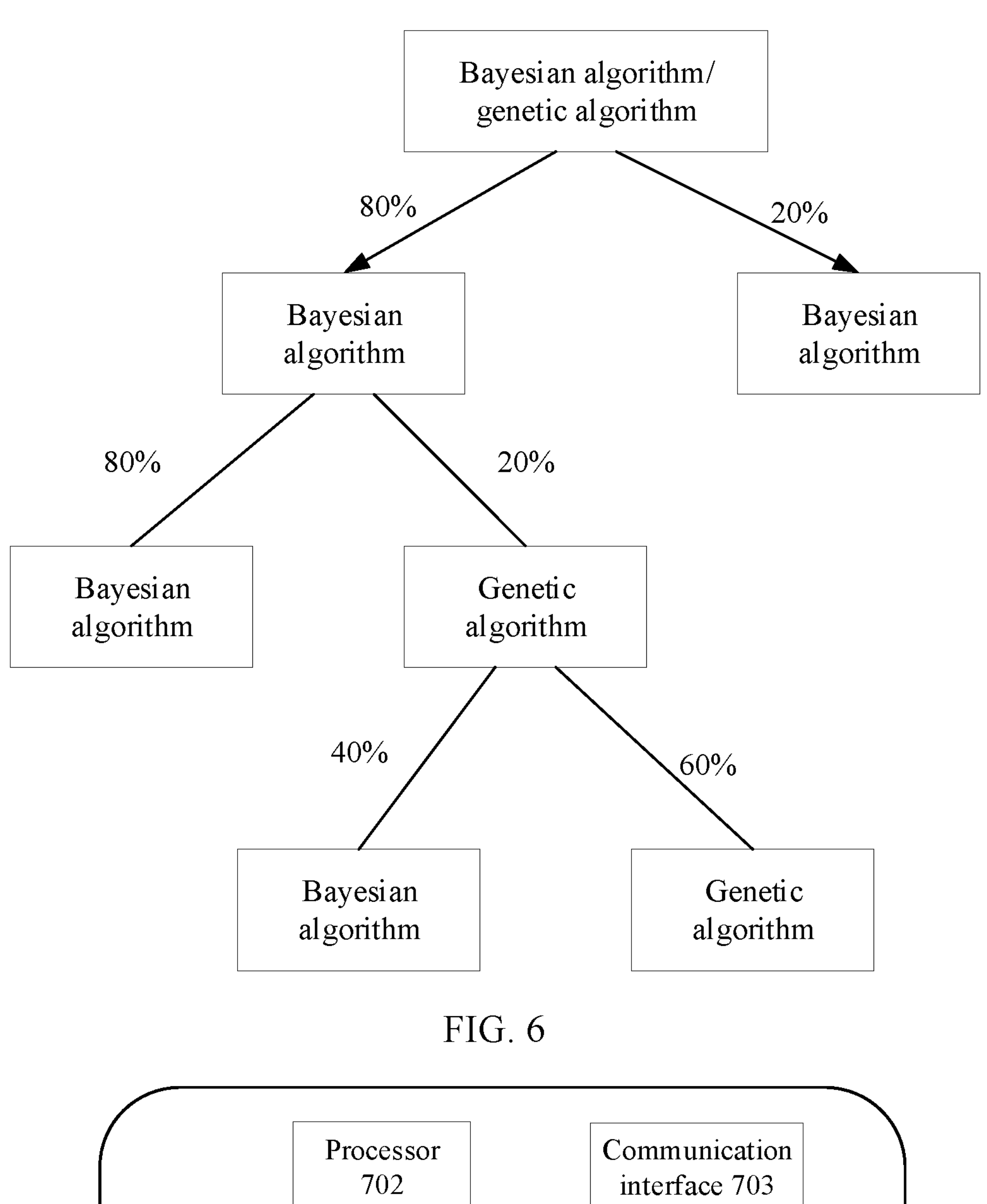
FIG. 6 is a schematic diagram of condition-based determining control logic based on a probability according to an embodiment of this application.
FIG. 7 is a schematic diagram of a structure of a device according to an embodiment of this application.

Refer to a schematic diagram of probability-based if-then control logic shown in FIG. 6. As shown in FIG. 6, in a round of iteration process, a parameter configuration system 100 determines that a probability of a Bayesian algorithm is 80%, a probability of a genetic algorithm is 20%, and the parameter configuration system 100 selects an optimization algorithm according to the probabilities to perform parameter optimization. The parameter configuration system 100 selects the optimization algorithm according to a principle that an algorithm with a high probability is preferentially selected, and an algorithm with a low probability may also be selected. For example, in this round of iteration, the parameter configuration system 100 selects to use the Bayesian algorithm to perform parameter optimization.

Then, in a next round of iteration process, the parameter configuration system 100 determines that the probability of the Bayesian algorithm is 80%, and the probability of the genetic algorithm is 20%. In this round of iteration process, the parameter configuration system 100 chooses to use the genetic algorithm to perform parameter optimization, thereby achieving a small probability algorithm comeback.

The parameter configuration method provided in embodiments of this application is described above in detail with reference to FIG. 1 to FIG. 6. The following describes, with reference to the accompanying drawings, a parameter configuration system 100 and a computing device configured to implement functions of the parameter configuration system 100 provided in embodiments of this application.

Refer to FIG. 1. An embodiment of this application provides a parameter configuration system 100. The parameter configuration system 100 includes unit modules configured to perform the steps of the method corresponding to any implementation in the foregoing method embodiments. The following describes a structure of the parameter configuration system 100 by using an example.

Specifically, the parameter configuration system 100 includes an interface module 102 and a parameter optimization module 104. The interface module 102 is configured to receive a configuration parameter of a service system and a service objective of the service system through a standard interface. The parameter optimization module 104 is configured to perform parameter optimization on the configuration parameter to obtain a recommended parameter value that meets the service objective. The interface module 102 is further configured to output the recommended parameter value to configure the configuration parameter.

In some possible implementations, the interface module 102 is further configured to: receive at least one of load and a constraint condition through the standard interface.

The performing parameter optimization on the configuration parameter to obtain a recommended parameter value that meets the service objective includes: performing parameter optimization on the configuration parameter based on at least one of the load and the constraint condition, to obtain the recommended parameter value that meets the service objective.

In some possible implementations, the standard interface includes an application programming interface API.

In some possible implementations, the standard interface includes a configuration parameter API, a service objective API, a load API, and a constraint condition API.

In some possible implementations, the system 100 further includes: a control module 106, configured to determine, by using condition-based determining control logic, a parameter optimization algorithm corresponding to the configuration parameter.

In some possible implementations, the control module 106 is specifically configured to: determine, by using a condition-based determining decision tree, the parameter optimization algorithm corresponding to the configuration parameter.

In some possible implementations, the control module 106 is specifically configured to: determine a probability of at least one parameter optimization algorithm by using the condition-based determining control logic; and determine, according to the probability of the at least one parameter optimization algorithm, the parameter optimization algorithm corresponding to the configuration parameter.

In some possible implementations, the system 100 further includes: a parameter preprocessing module 108, configured to preprocess the configuration parameter.

The parameter configuration system 100 in this embodiment of this application may correspondingly perform the method described in embodiments of this application, and the foregoing and other operations and/or functions of modules/units of the parameter configuration system 100 are respectively intended to implement corresponding procedures of the methods in the embodiments shown in FIG. 3, FIG. 5, and FIG. 6. For brevity, details are not described herein again.

The functions of the parameter configuration system 100 may be implemented by using a computing device, for example, implemented by using a separate computing device or a computing cluster including a plurality of computing devices. The following provides a detailed description with reference to the accompanying drawings.

FIG. 7 provides a computing device. As shown in FIG. 7, the computing device 700 may be specifically configured to implement functions of the parameter configuration system 100 in the embodiment shown in FIG. 1. The computing device 700 includes a bus 701, a processor 702, a communication interface 703, and a memory 704. The processor 702, the memory 704, and the communication interface 703 communicate with each other by using the bus 701.

The bus 701 may be a peripheral component interconnect (PCI) bus, an extended industry standard architecture (EISA) bus, and or the like. The bus may include an address bus, a data bus, a control bus, and the like. For ease of representation, only one bold line is used for representation in FIG. 7, but this does not mean that there is only one bus or only one type of bus.

The processor 702 may be any one or more of processors such as a central processing unit (CPU), a graphics processing unit (GPU), a micro processor (MP), or a digital signal processor (DSP).

The communication interface 703 is an input/output (I/O) device. The communication interface 703 is configured to communicate with an external device, for example, configured to communicate with a service system 200. Specifically, the communication interface 703 may separately receive a configuration parameter and a service objective through a standard interface such as a configuration parameter API and a service objective API, or output a recommended parameter value through the standard interface such as a recommended parameter value API.

The memory 704 may include a volatile memory, for example, a random-access memory (RAM). The memory 704 may further include a non-volatile memory, for example, a read-only memory (ROM), a flash memory, a hard disk drive (HDD), or a solid-state drive (SSD).

The memory 704 stores executable program code. The processor 702 executes the executable program code to perform the foregoing parameter configuration method. Specifically, the communication interface 703 separately receives the configuration parameter and the service objective through the standard interface such as a configuration parameter API or a service objective API, and then transmits the configuration parameter and the service objective to the processor 702 through the bus 701. The processor 702 executes the foregoing program code, performs parameter optimization on the configuration parameter to obtain a recommended parameter value, and then transmits the recommended parameter value to the communication interface 703 through the bus 701. The communication interface 703 outputs the recommended parameter value through the standard interface such as the recommended parameter value API, to configure the configuration parameter.

Embodiments of this application further provide a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a digital versatile disc (DVD)), or a semiconductor medium (for example, a solid state disk), or the like. The computer-readable storage medium includes instructions, and the instructions instruct the computing device to perform the foregoing parameter configuration method applied to the parameter configuration system 100.

Embodiments of this application further provide a computer program product. The computer program product includes one or more computer instructions. When the computer instructions are loaded and executed on a computing device, procedures or functions according to embodiments of this application are all or partially generated.

The computer instructions may be stored in a computer-readable storage medium or may be transmitted from a computer-readable storage medium to another computer-readable storage medium. For example, the computer instructions may be transmitted from a website, computer, or data center to another website, computer, or data center in a wired (for example, a coaxial cable, an optical fiber, or a digital subscriber line (DSL)) or wireless (for example, infrared, radio, or microwave) manner.

The computer program product may be a software installation package. When any one of the foregoing parameter configuration methods needs to be used, the computer program product may be downloaded and executed on the computing device.

Descriptions of the foregoing procedures or structures corresponding to the accompanying drawings have respective focuses. For a part that is not described in detail in a procedure or structure, refer to related descriptions of other procedures or structures.

What is claimed is:

1. A parameter configuration method, comprising:
- receiving, through a standard interface, a configuration parameter of a service system and a service objective of the service system, wherein the standard interface comprises a configuration parameter application programming interface (API), a service objective API, a load API, and a constraint condition API;
- performing parameter optimization on the configuration parameter to obtain a recommended parameter value that meets the service objective; and
- outputting the recommended parameter value to configure the configuration parameter.

2. The parameter configuration method of claim 1, further comprising receiving, through the standard interface, at least one of a load or a constraint condition, wherein performing the parameter optimization comprises performing the parameter optimization on the configuration parameter based on the at least one of the load or the constraint condition.

3. The parameter configuration method of claim 1, wherein the standard interface comprises an application programming interface (API).

4. The parameter configuration method of claim 1, further comprising determining, using condition-based determining control logic, a parameter optimization algorithm corresponding to the configuration parameter.

5. The parameter configuration method of claim 4, wherein determining the parameter optimization algorithm comprises determining the parameter optimization algorithm using a condition-based determining decision tree.

6. The parameter configuration method of claim 4, wherein determining the parameter optimization algorithm comprises:
- determining a probability of at least one parameter optimization algorithm using the condition-based determining control logic; and
- determining, according to the probability, the parameter optimization algorithm.

7. The parameter configuration method of claim 1, further comprising preprocessing the configuration parameter.

8. A parameter configuration system, comprising:

an interface configured to receive, through a standard interface, a configuration parameter of a service system and a service objective of the service system, wherein the standard interface comprises a configuration parameter application programming interface (API), a service objective API, a load API, and a constraint condition API; and a parameter optimizer configured to perform parameter optimization on the configuration parameter to obtain a recommended parameter value that meets the service objective, wherein the interface is further configured to output the recommended parameter value to configure the configuration parameter.

9. The parameter configuration system of claim 8, wherein the interface is further configured to receive, through the standard interface, at least one of a load or a constraint condition, and wherein performing the parameter optimization comprises performing the parameter optimization based on the at least one of the load or the constraint condition.

10. The parameter configuration system of claim 8, wherein the standard interface comprises an application programming interface (API).

11. The parameter configuration system of claim 8, further comprising a controller configured to determine, using condition-based determining control logic, a parameter optimization algorithm corresponding to the configuration parameter.

12. The parameter configuration system of claim 11, wherein the controller is further configured to determine the parameter optimization algorithm using a condition-based determining decision tree.

13. The parameter configuration system of claim 11, wherein the controller is further configured to:

determine a probability of at least one parameter optimization algorithm using the condition-based determining control logic; and determine, according to the probability, the parameter optimization algorithm.

14. The parameter configuration system of claim 8, further comprising a parameter preprocessor configured to preprocess the configuration parameter.

15. A device, comprising:

a standard interface, wherein the standard interface comprises a configuration parameter application programming interface (API), a service objective API, a load API, and a constraint condition API; and one or more processors coupled to the standard interface and configured to cause the device to:

receive, through the standard interface, a configuration parameter of a service system and a service objective of the service system;

perform parameter optimization on the configuration parameter to obtain a recommended parameter value that meets the service objective; and output the recommended parameter value to configure the configuration parameter.

16. The device of claim 15, wherein the standard interface comprises an application programming interface (API).

17. The device of claim 15, wherein the one or more processors are further configured to cause the device to determine, using condition-based determining control logic, a parameter optimization algorithm corresponding to the configuration parameter.

18. The device of claim 17, wherein the one or more processors are further configured to cause the device to determine the parameter optimization algorithm using a condition-based determining decision tree.

19. The device of claim 17, wherein the one or more processors are further configured to cause the device to:

determine a probability of at least one parameter optimization algorithm using the condition-based determining control logic; and determine, according to the probability, the parameter optimization algorithm.

20. The device of claim 15, wherein the one or more processors are further configured to cause the device to receive, through the standard interface, at least one of a load or a constraint condition, and wherein performing the parameter optimization comprises performing the parameter optimization based on the at least one of the load or the constraint condition.

* * * * *